United States Patent [19]

Sindermann et al.

[11] Patent Number: 5,269,638
[45] Date of Patent: Dec. 14, 1993

[54] SPHERICAL PIPE SWITCH WITH SINGLE CHANNEL OR DOUBLE CHANNEL COCK

[75] Inventors: Martin Sindermann, Ravensburg; Eugen Rost, Wolfegg-Wassers, both of Fed. Rep. of Germany

[73] Assignee: Waeschle Maschinenfabrik GmbH, Ravensburg, Fed. Rep. of Germany

[21] Appl. No.: 878,038

[22] Filed: May 4, 1992

[30] Foreign Application Priority Data

May 7, 1991 [DE] Fed. Rep. of Germany ....... 4114949

[51] Int. Cl.$^5$ ............................................. B65G 53/56
[52] U.S. Cl. ..................................... 406/182; 406/183
[58] Field of Search ................... 406/1, 117, 155, 181, 406/182, 183, 192

[56] References Cited

U.S. PATENT DOCUMENTS 3,489,178 1/1970 Kice ..................... 406/183

FOREIGN PATENT DOCUMENTS 406577 1/1991 European Pat. Off. ............ 406/182

Primary Examiner—David M. Mitchell
Assistant Examiner—Andrew C. Pike
Attorney, Agent, or Firm—Henry M. Feiereisen

[57] ABSTRACT

A pipe switch includes a housing with a cock having at least one straight passageway for selectively connecting cylindrical conduits. In order to avoid a geometric joint in both rotational directions without requiring complicated refinishing processes while yet keeping the cross section of the passageway constant, the circumferential surface of the cock and the housing inner surface are designed as coextensive freely-shaped surfaces with such a curvature that the ports of the passageway and the housing conduits are at least essentially coincidental plane sectional surfaces in both rotational positions of the cock.

3 Claims, 6 Drawing Sheets

SPHERICAL PIPE SWITCH WITH SINGLE CHANNEL OR DOUBLE CHANNEL COCK

BACKGROUND OF THE INVENTION

The present invention refers to a pipe switch or multiport valve for pneumatically conveying bulk material, and in particular to a pipe switch of the type including a housing provided with a first cylindrical conduit and a second cylindrical conduit with aligned housing ports and with a third cylindrical conduit, with the housing accommodating a cock which is rotatable between rotational positions for selectively connecting the first conduit with the second and third conduits via at least one straight cylindrical flow channel.

A pipe switch of this type is known for example from German patent DE-PS 38 17 349 which includes a cock with two flow channels. What is common to all of these conventional pipe switches is that in the first rotational position of the cock, the axis of the first conduit, the flow channel and the axis of the second conduit are in alignment. Thus, the passageway has a continuous cylindrical cross section. However, in the second rotational position of the cock in which the first conduit is in communication with the third conduit via the same flow channel or a separate parallel second flow channel of the cock, a so-called geometric joint (a juncture of sudden cross sectional change when a first (pipe) cross section is continued by a non-coincidental second (pipe) cross section) is created between the housing port of the first conduit and the opposing port of the respective flow channel of the cock. Such a geometric joint is created because the extension of the cylindrical inside wall surface of the housing with the preceding cylindrical tubular cross section of the conduit and the respective extension of the cylindrical circumferential surface of the cock with the cylinder as described by the flow channel generate sectional surfaces, which, because of the eccentricity of the respective cylinder axes, are asymmetric with regard to the bisecting surface line of the inside surface of the housing and circumferential surface of the cock. The sudden cross-sectional change caused by this asymmetry can be eliminated through refinishing of at least one of the ports. This not only complicates the manufacturing process but also alters the circular configuration of the cross section of the passageway when the cock occupies its first rotational position.

European publication EP 0 406 577 A1 discloses a pipe switch with a cock including one flow channel, in which the creation of a geometric joint in the second rotational position of the cock is avoided by providing the port of the first conduit and the opposing ports of the flow channel of the cock in form of a plane, elliptic sectional surface, which, based on the principle of the miter cut, lies upon the bisecting line of an angle defined by the axis of the conduit and the axis of the flow channel. However, in order to attain a smooth juncture between the flow channel of the cock and the second conduit in the first rotational position of the cock, further suitable cross sectional modifications are required in this area. Moreover, the cock can not be made as a one-piece cast part because for manufacturing reasons the provided miter cut surface can only be accomplished by inserting a pipe in the cock.

SUMMARY OF THE INVENTION

It is thus an object of the present invention to provide an improved pipe switch obviating the afore-stated drawbacks.

In particular, it is an object of the present invention to provide an improved pipe switch including a cock with rotationally symmetrical circumferential surface in which the creation of a geometric joint in both rotational positions of the cock is prevented at the juncture to all conduits, without requiring complicated refinishing processes or modifications of respective cross sections in the area of the ports of the conduits.

These objects and others which will become apparent hereinafter, are attained in accordance with the present invention by providing the cock with a convex circumferential surface and the housing with a coextensively concave inside surface such that in each of the rotational positions of the cock the ports of the flow channel and the respectively opposing ports of the conduits are at least essentially coincidental plane sectional surfaces which lie on the bisecting line of a complementary angle to the angle defined by two straight lines, with one straight line extending between the center of the port of the first conduit and the center of the port of the second conduit, and with the other straight line extending between the center of the port of the first conduit and the center of the port of the third conduit.

In accordance with the present invention, the circumferential surface of the cock (and accordingly the inside surface of the housing) is thus not a cylindrical surface but a freely-shaped surface area (a random surface area which is characterized by varying radii of curvature) whose contour is defined by known geometric relations, i.e. in dependence of the outlet angle of the conduits, the main diameter of the cock as well as the diameter of its flow channel, and in case the cock is provided with only one flow channel the eccentricity of the flow channel relative to the center axis of the cock.

According to a further feature of the present invention, the circumferential surface of the cock and the inside wall surface of the housing are substantially spherically curved so as to have a constant radius of curvature. Practice has shown that in most applications, the described freely-shaped surface can be essentially designed with great approximation in form of a sphere and still keep the remaining deviations from the precise configuration of the freely-shaped surface within manufacturing tolerances.

In a pipe switch according to the invention, the ports of the three conduits do not extend in planes perpendicular to the conduit axes. For creating varying inlet angles and outlet angles, the cylindrical conduits may thus be turned by 180° about the axis which is oriented perpendicular to the sectional plane of the pertaining port, without requiring geometric modifications of the housing and/or cock.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
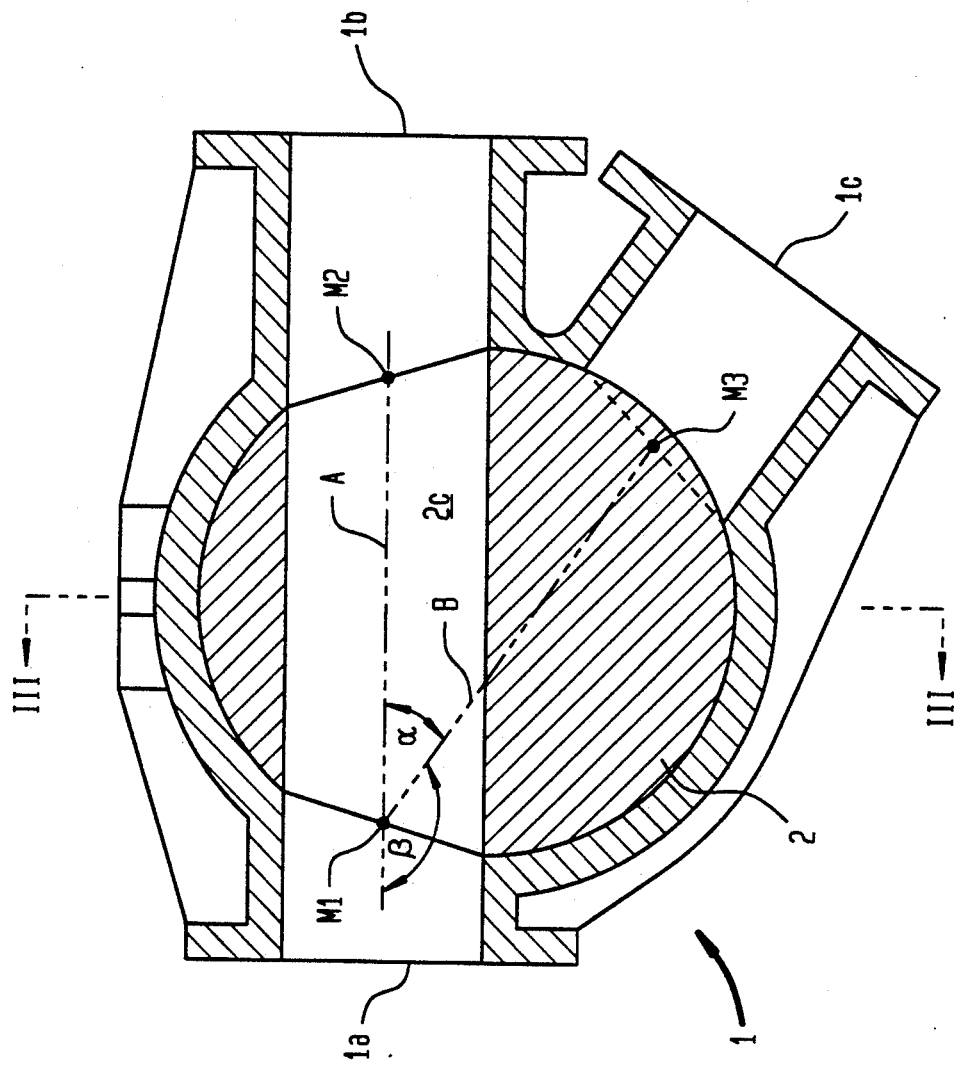
FIG. 1 is a longitudinal section of one embodiment of a pipe switch according to the present invention, illustrating the cock in a first rotational position, taken along the line IV—IV in FIG. 6.

Throughout all the Figures, the same or corresponding elements are always indicated by the same reference numerals.

Figure 2:
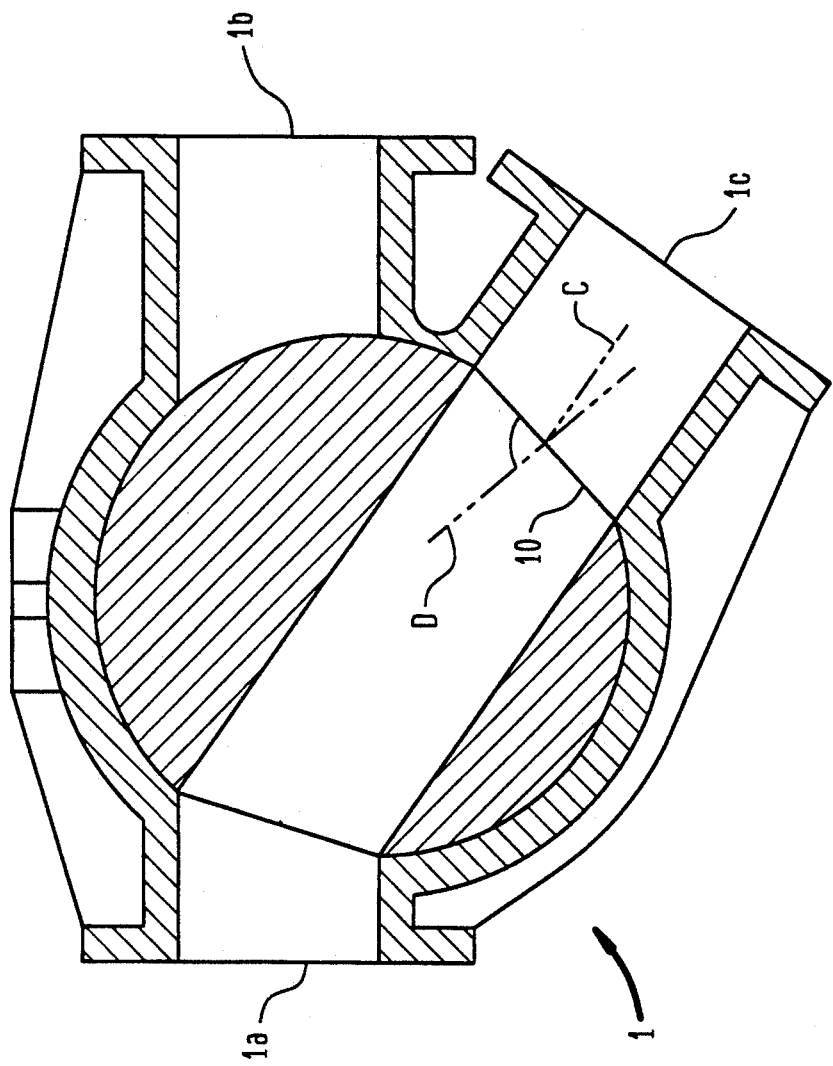
FIG. 2 is a longitudinal section of the pipe switch of FIG. 1, with the cock being in a second rotational position, taken along the line I—I in FIG. 3.

Referring now to the drawing and in particular to FIGS. 1 and 2, there is shown a longitudinal section of one embodiment of a pipe switch or multiport valve in accordance with the present invention for conveying bulk material or the like, including a housing 1 of approximate Y-shape which includes three circumferential, generally cylindrical conduits 1a, 1b and 1c. Accommodated within the interior of the housing 1 is a rotor or cock 2 which is preferably a one-piece cast part and includes a generally cylindrical flow channel 2c for selectively connecting the first conduit 1a with the second conduit 1b along a rectilinear passageway, as shown in FIG. 1, and with the third conduit 1c along an angled passageway, as shown in FIG. 2.

Figure 3:
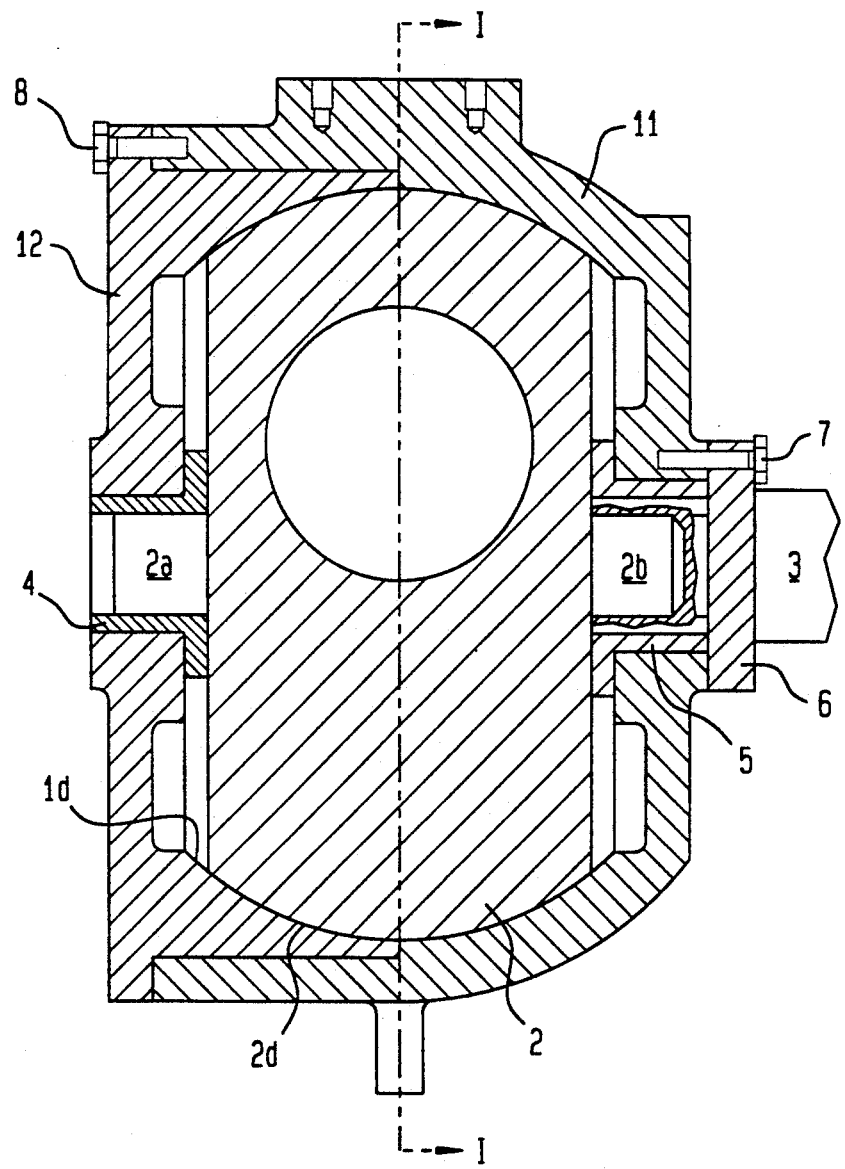
FIG. 3 is a cross sectional view of the pipe switch taken along the line III—III in FIG. 1.

Turning now to FIG. 3, which is a cross sectional view of the pipe switch taken along the line III—III in FIG. 1, it can be seen that the cock 2 is rotatably supported in side covers of the housing 1 via journals 2a, 2b, with journal 2a being supported at one side of the housing 1 via an interposed bushing 4. The other journal 2b is snugly fitted in force-locking manner within a pivot pin 3 which is enclosed in the housing 1 by a suitable bushing 5 and externally acted upon by a drive unit (not shown) for rotating the cock 2 between its respective rotational positions. A cover 6 is laterally mounted to the housing 1 by means of screws 7.

Persons skilled in the art will understand that the drive unit for the cock 2 must contain much additional apparatus which, however, does not form part of the invention and has thus been omitted from the drawing for sake of simplicity.

In order to attain a coincidence or coextension of the ports of the flow channel 2c at the perimeter of the with the opposing ports of the conduits 1a, 1b, 1c at the perimeter of the housing 1 when the cock 2 occupies its respective rotational positions, the cock 2 and of the housing 1 are designed to fulfill two geometric conditions:

1) The major axis of the ellipse described by the contour of the respective port lies on the bisecting line of the complementary angle $\beta$ to the angle $\alpha$ which is defined by the straight lines A, B (FIG. 1), with straight line A extending between the center M1 of the port area of conduit 1a and center M2 of the port area of conduit 1b, and with straight line B extending between the center M1 of the port area of conduit 1a and center M3 of the port area of conduit 1c.

2) The circumferential surface 2d of the cock 2 and the complementary inside surface 1d of the housing 1 are freely-shaped surfaces which essentially approximate a sphere having a radius defined on the basis of the relevant geometric realities of the pipe switch and the requirement that all respective port areas should be plane sectional surfaces in order to meet the conditions of a miter cut.

Since the circumferential surface of the cock 2 is at least approximately of spherical configuration, the housing 1 is made of two parts, with the parting plane coinciding with the main diameter plane. Thus, as shown in FIG. 3, the housing 1 includes a main housing element 11 and a cover-like housing element 12 which is threadably engaged to the housing element 11 by suitable screws 8.

Since the respective port areas are of mitered or bevelled configuration, the longitudinal axes of the respective conduits do not extend at a right angle to the pertaining port planes. Thus, the conduits 1a, 1b, 1c may be arranged at two different outlet angles, without requiring a geometric modification of the housing 1 and of the cock 2. As shown in FIG. 2, the axis C of conduit 1c may be mirrored about the axis D which extends perpendicular upon the port plane 10. In this manner, it is possible for example to create an outlet configuration under 90° instead of the slanted outlet configuration under 45°.

Figure 4:
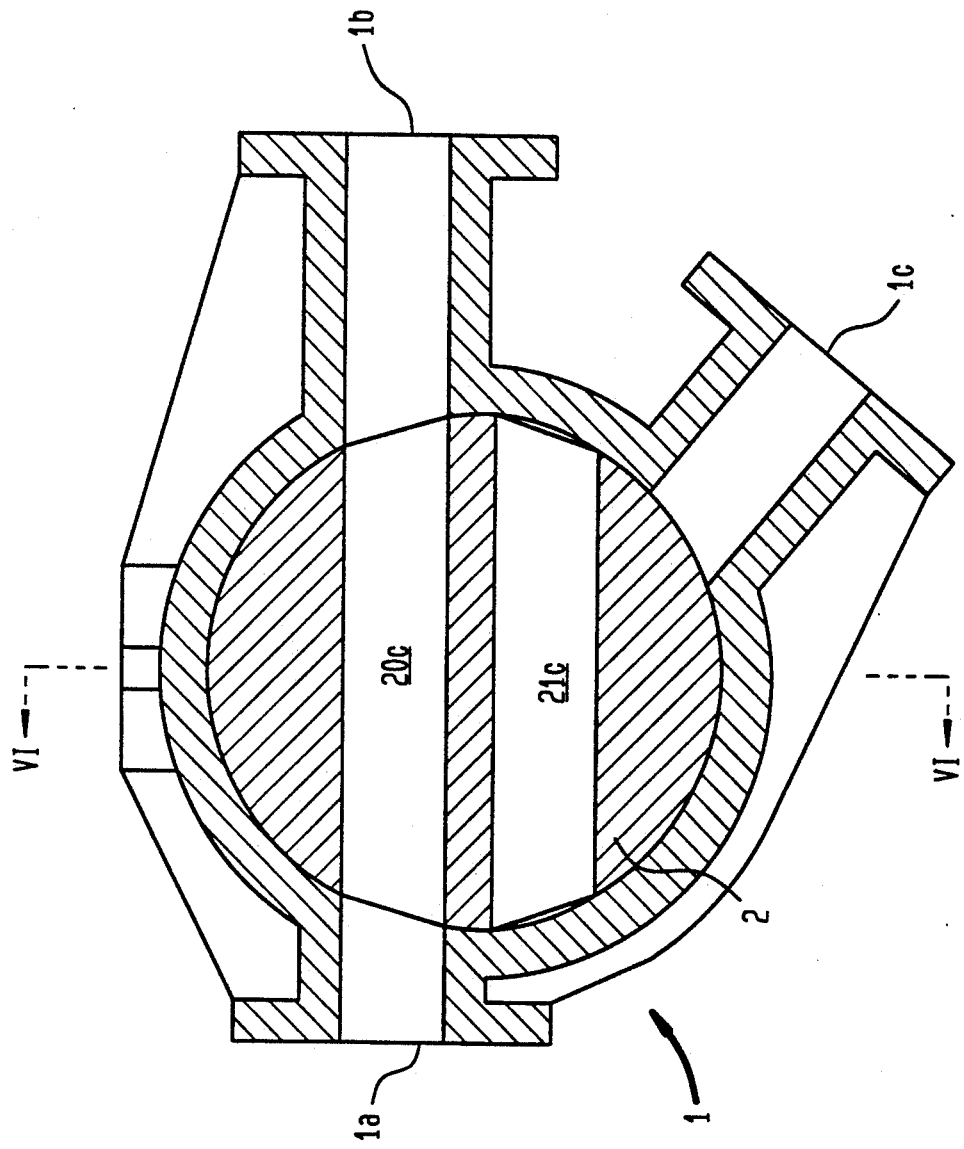
FIG. 4 is a longitudinal section of another embodiment of a pipe switch according to the present invention, illustrating the cock in a first rotational position.
Figure 5:
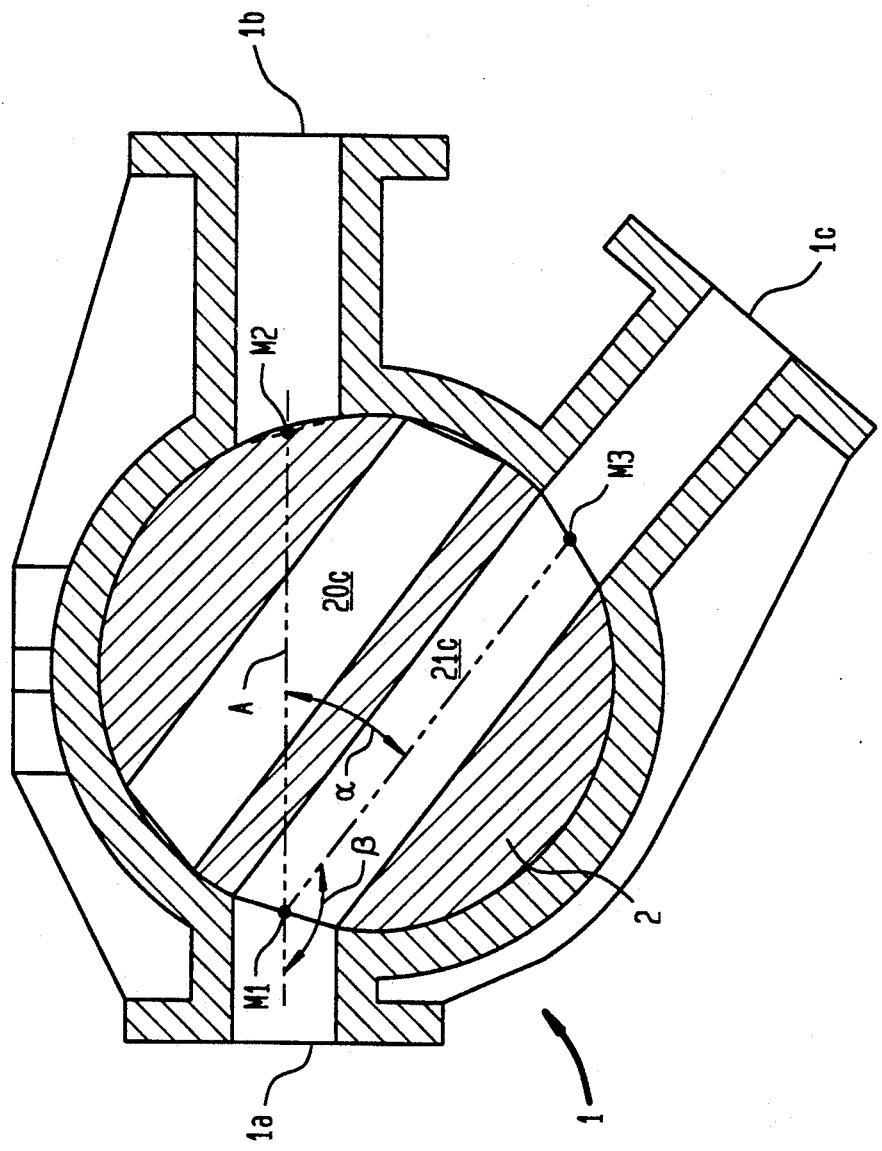
FIG. 5 is a longitudinal section of the pipe switch of FIG. 4, with the cock being in a second rotational position.
Figure 6:
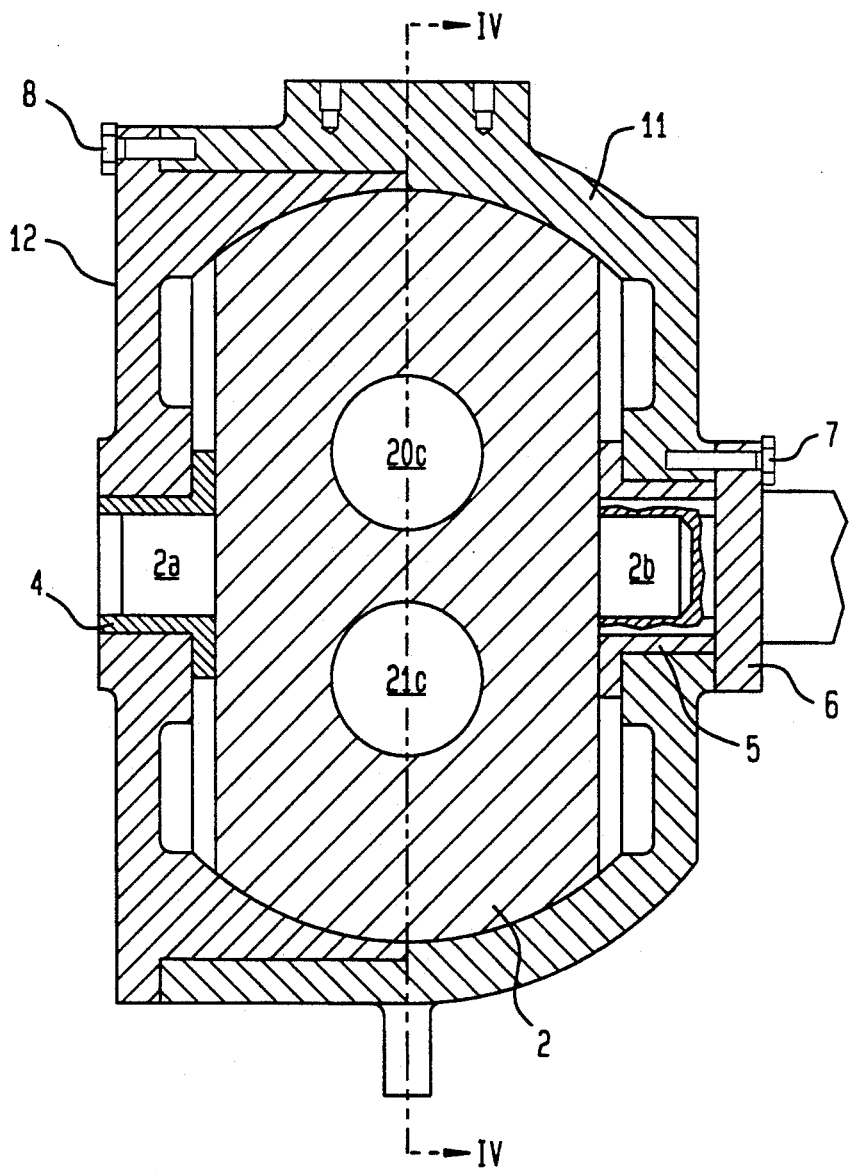
FIG. 6 is a cross sectional view of the pipe switch taken along the line VI—VI in FIG. 4.

Turning now to FIGS. 4-6, there is shown a second embodiment of a pipe switch or multiport valve in accordance with the present invention, with the difference to the first embodiment shown in FIGS. 1-3 residing in that the housing 1 accommodates a rotor or cock 2 which is provided with two parallel, generally cylindrical, flow channels 20c and 21c for selectively connecting the first conduit 1a with the second conduit 1b along a rectilinear passageway, as shown in FIG. 4, and with the third conduit 1c along an angled passageway, as shown in FIG. 5.

By providing two flow channels 20c, 21c for respectively connecting the first conduit 1a with the second and third conduits 1b, 1c, the angle of rotation of the cock 2 can be kept to a magnitude in correspondence with the angle as described by the axes of the conduits 1b, 1c. As shown in particular in FIG. 5, the ports of the flow channels 20c, 21c and the opposing ports of the conduits—in this case conduits 1a and 1c—define plane and bevelled sectional surfaces which are created in a same manner and in accordance with the same geometric relations as previously described in connection with the embodiment of FIGS. 1 to 3. It should be noted for purposes of clarification that these conditions as set forth above are fulfilled for the juncture between the conduit 1a and the flow channel 21c in the second rotational position of the cock 2 as shown in FIG. 5 and, because of the circumferential symmetry of the cock 2, it inevitably follows that also the other port of the flow channel 21 as well as the ports of the flow channel 20c and the conduits 1b and 1c meet the same conditions.

While the invention has been illustrated and described as embodied in a pipe switch with single channel or double channel cock, it is not intended to be limited to the details shown since various modifications and structural changes may be made without departing in any way from the spirit of the present invention.

What is claimed as new and desired to be protected by Letter Patent is set forth in the appended claims:

We claim:

1. A pipe switch for pneumatically conveying bulk material, comprising:

a housing having a first conduit defining a port, a second conduit defining a port in alignment with said port of said first conduit, and a third conduit defining a port; and a cock rotatably supported in said housing and movable between two rotational positions for selectively controlling the flow of bulk material from said first conduit to said second and third conduits via at least one passageway, said cock having a convex circumferential surface and said housing having a coextensively concave inside surface to configure said cock of approximate spherical shape so that in each of said rotational positions of said cock each port of said passageway and an opposing port of said conduits are coincidental plane sectional surfaces which lie on the bisecting line of a complementary angle to an angle defined by two straight lines, with on of the straight lines extending between the center of the port of said first conduit and the center of the port of said second conduit, and with the other one of the straight lines extending between the center of the port of said first conduit and the center of the port of said third conduit.

2. The pipe switch defined in claim 1 wherein said convex circumferential surface of said cock and said concave inside surface of said housing are spherically curved with a constant radius of curvature.

3. The pipe switch defined in claim 1 wherein said cock has journals rotatably supported laterally in said housing, with said journals extending perpendicular to a plane defined by the axes of said conduits.

* * * * *